United States Patent
Upton et al.

[11] Patent Number: 5,861,839
[45] Date of Patent: Jan. 19, 1999

[54] ANTENNA APPARATUS FOR CREATING A 2D IMAGE

[75] Inventors: Eric L. Upton, Redondo Beach; Yong Guo, Alhambra, both of Calif.

[73] Assignee: TRW Inc., Redondo Beach, Calif.

[21] Appl. No.: 858,646

[22] Filed: May 19, 1997

[51] Int. Cl.$^6$ .............................. G01S 3/00; H01Q 13/10
[52] U.S. Cl. ................................. 342/350; 343/767
[58] Field of Search .................... 342/350, 351, 342/367; 343/757, 767, 839, 700 MS

[56] References Cited

U.S. PATENT DOCUMENTS

| | | | |
|---|---|---|---|
| 3,213,456 | 10/1965 | Korvin | 343/756 |
| 3,316,548 | 4/1967 | D'Amico | 343/7.4 |
| 3,449,657 | 6/1969 | Fredriksson et al. | 343/895 |
| 3,453,630 | 7/1969 | Thompson | 343/757 |
| 3,503,075 | 3/1970 | Gerst | 343/895 |
| 3,521,289 | 7/1970 | Mayers et al. | 343/895 |
| 3,603,989 | 9/1971 | Caspers | 343/5 R |
| 3,868,685 | 2/1975 | Wilmot | 343/5 DP |
| 3,940,772 | 2/1976 | Ben-Dov | 343/895 |
| 4,150,379 | 4/1979 | Connors | 343/100 ME |
| 4,837,576 | 6/1989 | Schwarz | 343/77 |
| 4,843,403 | 6/1989 | Lalezari et al. | 343/767 |
| 5,008,678 | 4/1991 | Herman | 342/158 |
| 5,032,846 | 7/1991 | Chang | 343/882 |
| 5,036,335 | 7/1991 | Jairam | 343/767 |
| 5,038,151 | 8/1991 | Kaminski | 343/727 |
| 5,170,176 | 12/1992 | Yasunaga et al. | 343/895 |
| 5,450,093 | 9/1995 | Kim | 343/895 |
| 5,467,072 | 11/1995 | Michael | 340/436 |
| 5,748,153 | 5/1998 | McKinzie, III et al. | 343/767 |

*Primary Examiner*—Mark Hellner
*Attorney, Agent, or Firm*—Michael S. Yatsko

[57] ABSTRACT

There is provided an apparatus 10 for transceiving millimeter electromagnetic waves (MEW) creating a high resolution image of a field of view sensed by a flexibly resilient tapered slot antenna 12 formed with a resonant cavity 18 and a transformer horn 19; the antenna is affixed to solenoid unit 20 for imparting a vibratory force to the antenna causing it to scan a field of view. There is provided an integrated circuit signal processor chip 32 and a MEW signal affixed to the antenna 12. A 2 D amplitude modulator 34 is affixed to the leading edge of the antenna 12 adjacent the transformer horn 19 to impart orthogonality to the MEW signal that is transceived in order to achieve a 2 D azimuthal scan. The sensed signal is matched in the processor 32 which has input a template of an orthogonally power distributed beam by auto-correlation to the template.

18 Claims, 7 Drawing Sheets

ANTENNA APPARATUS FOR CREATING A 2D IMAGE

BACKGROUND

1. Field of the Invention

This invention relates generally to an imaging recognizing apparatus and in particular to an oscillating tapered slot antenna that scans a field of view transceiving millimeter electromagnetic waves ("MEW") and processing the transceived energy to create a readable image.

2. Discussion

The antenna structures of this invention are capable of creating an image by active or passive operation of the oscillating tapered slot antenna by scanning a field of view. Tapered slot antennas are generally known. However, the flexibly resilient tapered slot antenna of this invention generates a high resolution orthogonal power distributed beam pattern. There is available in the antenna art phased array antenna structures capable of producing a two-dimensional scan through electronic phase shifting elements adjusted in time to yield a two-dimensional scan. For instance such antenna requirements are useful in collision avoidance radar systems for automobiles. Of necessity, such structures are physically quite large, costly to construct and lack in resolution and reliability. Further, they do not effectively sense higher frequencies in a passive mode. Other approaches have been employed to mount parabolic antennas, planar slot antennas or Yagi antennas moveable on gimbles that mechanically provide the necessary sweep of the field of view.

Antenna structures useful for radar applications such as the aforementioned collision avoidance require that they be physically small, that they be able to sense signals in two dimensions, that is 2 D, have a high resolution and broadband characteristics as well as radiation patterns and impedance characteristics that are essentially independent of frequencies over a wide range. The antenna structure of this invention is particularly useful in night vision scanners, robotic devices, it can be used in manufacturing operations, radar-type sensors for automobile collision avoidance having a directional clutter mapping facility.

Accordingly, the antenna structures preferably should be able to synthetically generate two-dimensional direction apertures. In the instant invention the two-dimensional aperture is obtained by oscillating the flexibly resilient tapered slot antenna creating an azimuth deflection and beam weighting. The creation of an azimuth deflection and beam weighting is achieved by a discrete set of elevation scan beams that are modified to have an orthogonal power distribution to each other in the azimuth direction.

SUMMARY OF THE INVENTION

The invention provides an apparatus for transmitting and receiving MEWs capable of creating an image of a field of view that includes a flexibly resilient slot array antenna having a metallized layer formed on one surface of a dielectric substrate. The metallized layer is formed into a tapered slot providing a resonant cavity and a horn portion that functions as a transformer. The antenna has integrated thereon transceiver elements disposed adjacent the resonant cavity. The flexibly resilient tapered slot antenna is mounted in a vacuum environment and imparted an oscillating motion by means of a suitable vibratory driver. The MEW emitted from the transceiver devices or that is sensed is imposed on a 2 D amplitude modulator associated with the horn portion of the tapered slot antenna. The 2 D modulator distorts the MEW signal into a random orthogonal power distribution pattern.

There is provided a signal processing integrated circuit for correlating the signal that is being transmitted or received with a predetermined reference template for performing an auto-correlation comparison of the sensed signal with the template. The creation of an orthogonal power distribution beam pattern is accomplished by interposing a 2 D amplitude modulator at the lead end of the tapered slot antenna. The 2 D amplitude modulator is constructed by depositing metal strips on a dielectric insulating substrate in a precise geometric pattern with each metal strip orthogonal to an adjacent strip. The pattern is determined by following a code transfer function such as a Walsh function. Each line of deposited metal strip is set down in a precise geometric pattern, with each strip having a predetermined length and width so that each line of metal strips correlate to a high signal value and cross-correlate to any other code in the code regime to zero. The dimensions of each metal strip are a function of the wave length of the signal that is modulated. The 2 D amplitude modulator represents a basis function imposed on the MEWs.

There is provided control circuitry for creating a readable image matching the transceiving MEWs modulating the MEWs to transform the signal into a random orthogonal power distribution beam pattern, down converting the signal to a low-level intermediate frequency and digitizing the IF signal. The digitized signal is then processed in a signal processor where the random orthogonal power distributed beam pattern of interest is matched by auto-correlation with a template of a predetermined random orthogonal power distribution wave pattern.

BRIEF DESCRIPTION OF THE DRAWINGS

These and other features, aspects, and advantages of the present invention will become better understood from the following description, appended claims, and accompanying drawings:

DETAILED DESCRIPTION OF THE PREFERRED EMBODIMENTS

Figure 1:
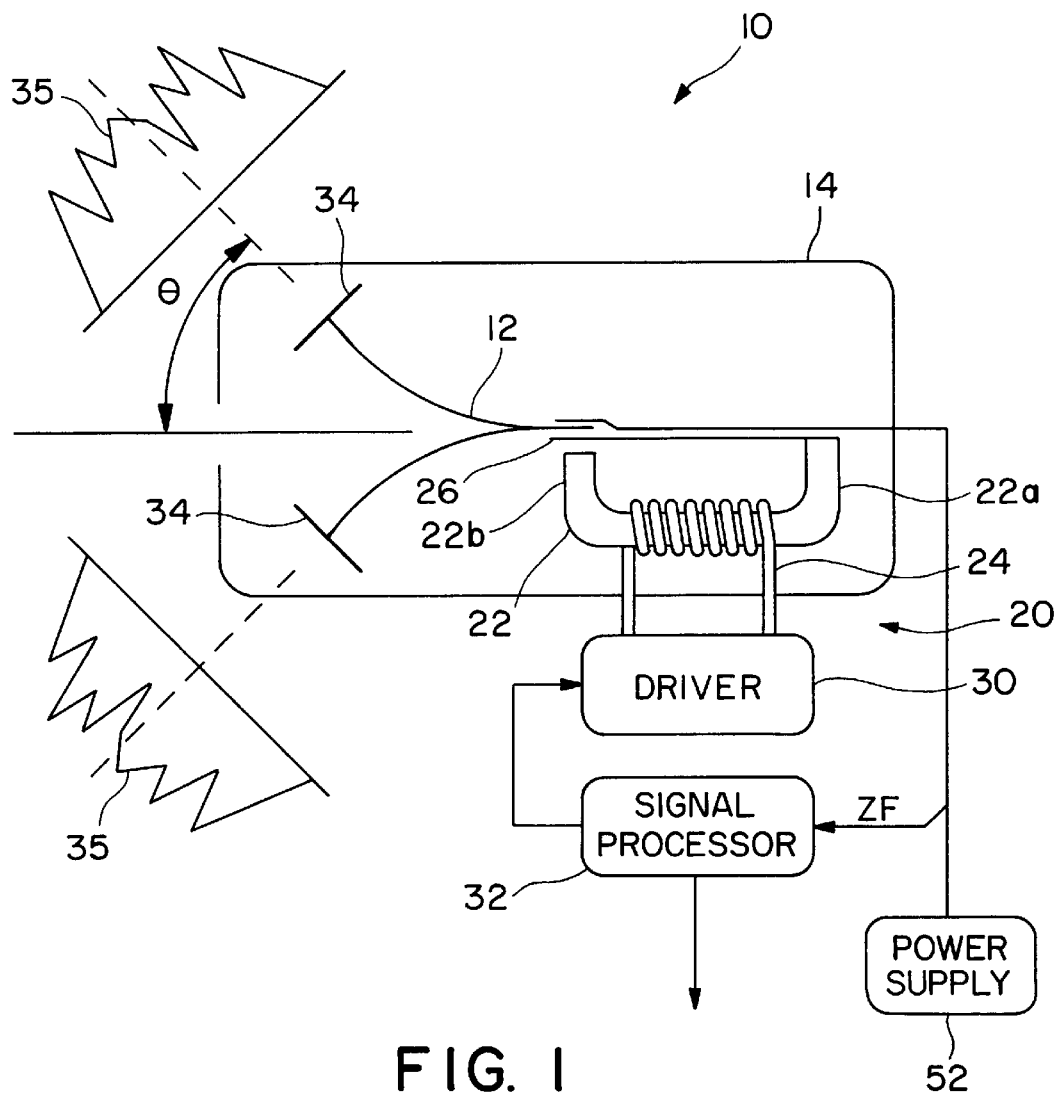
FIG. 1 is a schematic representation of the tapered slot antenna of this invention in a vacuum environment equipped with a mechanism for oscillating the antenna.
Figure 2A:
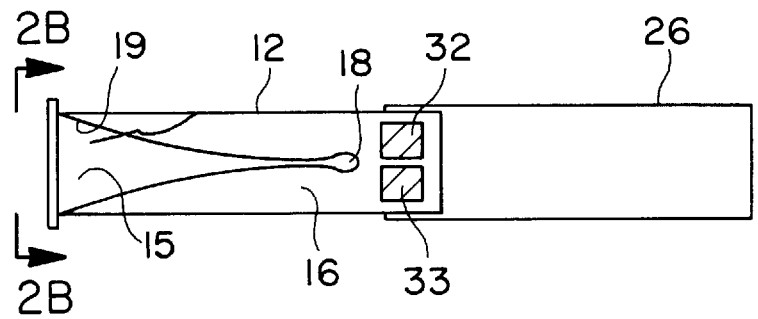
FIG. 2a is the top view of the tapered slot antenna of FIG. 1 having affixed to its leading edge the 2 D amplitude modulator.
Figure 2B:
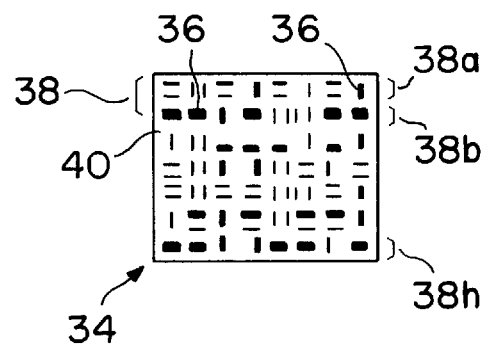
FIG. 2b is the front elevation of the 2 D modulator taken along line 2b—2b of FIG. 1.

Referring to FIGS. 1, 2a and 2b, there is shown the apparatus of this invention identified with the general reference numeral 10. The tapered slot antenna 12 is contained in a glass enclosure 14 which is evacuated to a pressure of less than 1 Thor. The antenna 12 comprises a reed-like membrane formed of a substrate such as glass, polyester films such as polyisocyanate, polyethylene or polyvinyl acetate. Generally, the substrate must be a dielectric material that is flexibly resilient and can oscillate in response to some form of vibrating driver. The substrate, such as glass, may be in the range of 5–10 mils in thickness. There is deposited on the substrate a conductive metallized pattern 16, preferably copper, in the form of the tapered slot configuration using well-known photoetching techniques. The slot antenna is configured with a resonant cavity 18 and a horn portion that functions as a transformer 19. The size of the antenna that was investigated in the development of the antenna structure 10 was a reed-like member 2 cm wide and 5 cm in length. It will be appreciated that the dimensions of the tapered slot antenna 12 is a function of the frequency of the signal that is to be transceived. Generally the antenna dimensions are proportional to the wavelength of the MEW signal. In the instant case, the preferred flexibly resilient tapered slot antenna size is in the range of 1 cm×3 cm to 3 cm×10 cm to appropriately transceive MEW energy in the 90–96 GHz range. Understandably, the useful range for practical size antennas would be from 10 GHz to above 95 GHz. As is well-understood, sensing frequencies under 10 GHz would significantly increase the size of the required antenna.

The driving mechanism for imparting the oscillating movement of the antenna is a solenoid unit 20 comprising a "U" shaped magnetic core 22 having leg portions 22a and 22b about which is wound a conductive wire 24 forming an electromagnetic generator. A cantilever mounted armature 26 is attached to one end of the leg portion 22a which is caused to vibrate in response to energization of the solenoid 20. One end of the antenna, opposite the transformer horn portion 19 is affixed to the free end of the armature 26. The periodic energization of the solenoid 20 causes the armature to vibrate thereby imparting an oscillating motion to the antenna 12 causing it to oscillate through a deflection angle θ. The solenoid 20 includes a driver unit 30 connected to the wire coil 24 which imparts the periodic energization of the magnetic core 22 imparting the vibratory motion to the antenna 12.

It will be recognized that the placement of the antenna 12 and the magnetic core of the solenoid assembly 20 within the glass enclosure 14 is for the purpose of minimizing the dampening effect of air on the oscillation of the antenna 12. Under near vacuum conditions the flexibly resilient antenna 12 can be made to oscillate with very low energy input and at an appropriately steady frequency.

A pair of integrated circuit microchips 32 and 33 are affixed to the metallized surface 16 of the antenna 12 adjacent the MEW resonant cavity 18. The transformer horn 19 is impedance matched to the resonant cavity 18. The integrated chips 32 and 33 represent the control circuitry responsible for the operation of the antenna structure as a millimeter wave transceiver. The chip 32 is a signal processor that processes the signal after it has been down converted to an intermediate frequency signal (IF) FIG. 5. The integrated circuit chip 33 is a millimeter wave transceiver that transmits or receives the MEW energy for apparatus 10 when it is functioning as a passive or active device. At the lead edge of the antenna 12 adjacent the transformer horn 19 is affixed a wafer 34 which serves to distort the MEW signal generated by the chip 33 in accordance with a basis function generating an orthogonally randomly-distributed power beam. The wafer amplitude modulator 34 is placed normal to the surface plane of the antenna 12. The construction of the amplitude modulator 34 requires the placement of a series of conductive strips 36 of predetermined length and width arrayed in a series of rows 38 adhered to a base support 40. The base support 40 is a dielectric material such as styrofoam which is transparent to the MEW energy. The size and geometry of the strips 36 and the rows 38 as arrayed on the substrate is proportional to the wavelength of the MEW energy 33 to be modulated. The size and geometry of each of the strips 36 is determined by the mathematical formulas set forth in the Walsh code functions. The unique function of the amplitude modulator 34 is that it modifies the MEW signal received by the modulator either when the signal is received or transmitted. The first row of elements 38a serve to auto-correlate the beam and it is cross-correlated to zero power by the remaining rows 38b–38n in the arrays. The pattern of metal strips 36 is specific so that the elements are orthogonal to one another. It will be understood that modulation of the MEW signal that is received or transmitted is essential to modulating the signal to orthogonal form. It will be understood that besides the Walsh functions, other equivalent code book transforms may be used to optimize the detection criteria. The 2 D amplitude modulator 34 is adhered to the lead edge of the antenna 12 (FIG. 2b) adjacent the transformer horn 19. It oscillates with the antenna as shown in FIG. 1. Referring again to FIG. 1 there is shown in simplified form the random distributed power beam pattern 35 generated by the antenna 12 as it sweeps across the field of view through the angle θ. The beam pattern 35 is obtained by plotting the MEW power transmitted or received by the antenna against its azimuth angle.

In the instant invention, the following equation represents one approach to the construction of the 2 D amplitude modulator 34.

$$A(t) = \sum_{n=1}^{m} (W_n \times S_{n+t}) \qquad \text{Equation 1}$$

Figure 3:
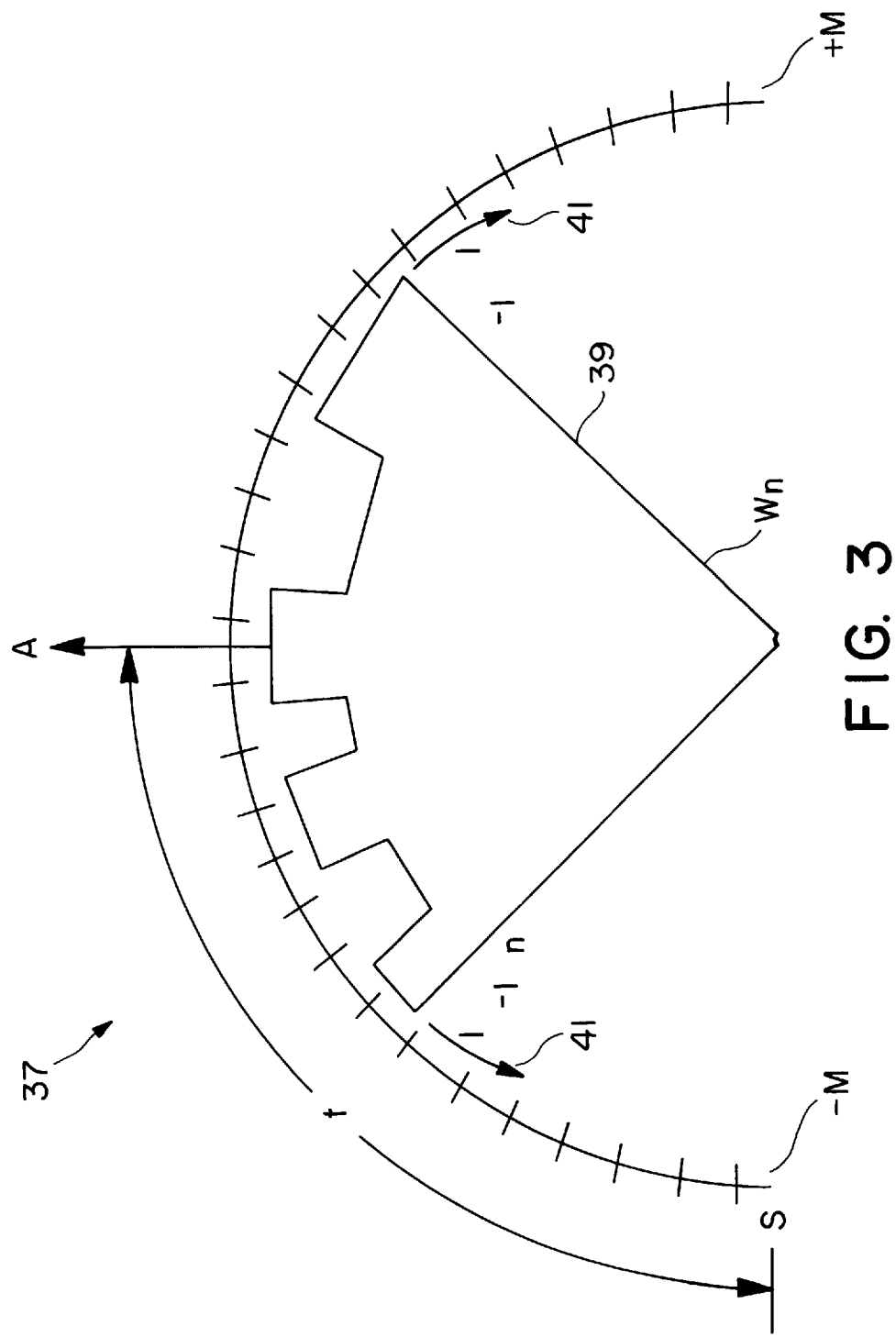
FIG. 3 is a diagram illustrating the signal amplitude of Equation 1 as a function of time as matched to the distributed values of the power $W_n$.

The diagram identified generally by numeral 37, shown in FIG. 3, illustrates the operation of Equation 1 which determines the amplitude of the power signal S as a function of the angle θ of scan of the antenna in the field of view. The wave template 39 is the wave form that is transmitted or received as shaped by the amplitude modulator 34 representing the basis function. As the antenna 12 sweeps across the field of view, it will sense a value of S in any instant time (t) is the signal power that is returned to the antenna at each position of –M through M. $W_n$ 39 is the distribution of the weighted values of power in accordance with the shaped pattern of $W_n$ that is applied to the power signal S. The weighting structure $W_n$ is a function of the angle across the antenna sweep. Referring to equation 1, the amplitude is the summation of $W_n$ times the signal S that is returned or transmitted at each position along the sweep of arc. The signal power S is a new value for each position because it is transceived from objects in the field of scan at each angular position of the antenna. The weighting factor $W_n$ therefore is a function of the waveform pattern that is imposed by the modulator 34. The amplitude in Equation 1 is determined as a function of time t. The values for $W_n$ vary from +1 to –1 relative to the baseline 41; as a signal drops below the baseline 41, it is a minus value and at the base line it is a plus value. If the pattern doesn't match with the modulator 34, it will result in a mismatch when the signal is correlated to the template 39 and hence there will be no signal transmission or reception.

Figure 4:
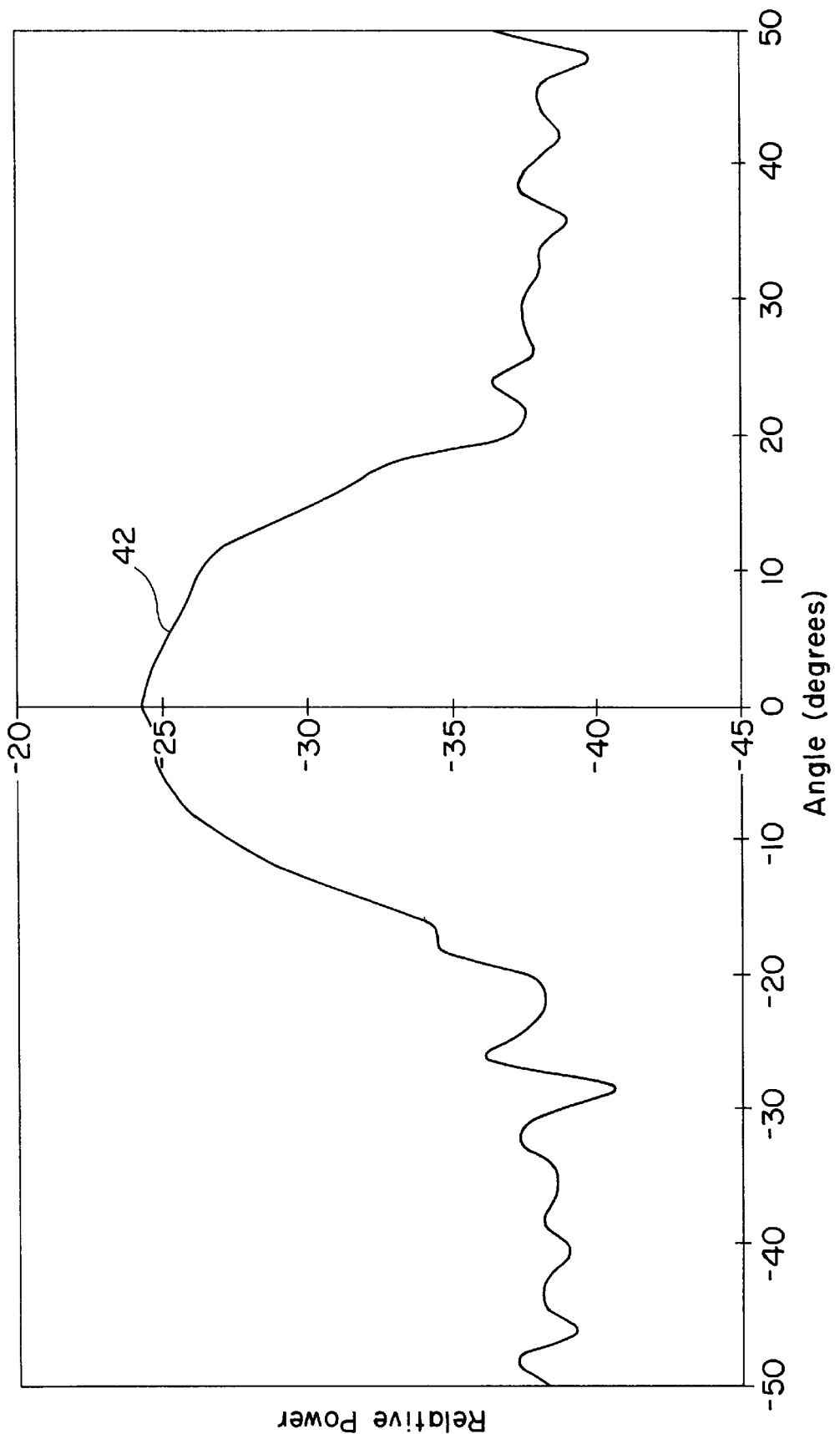
FIG. 4 is a plot of the prior art beam pattern in terms of the signal power received or transmitted as a function of the scan of a gimbled antenna.
Figure 5A:
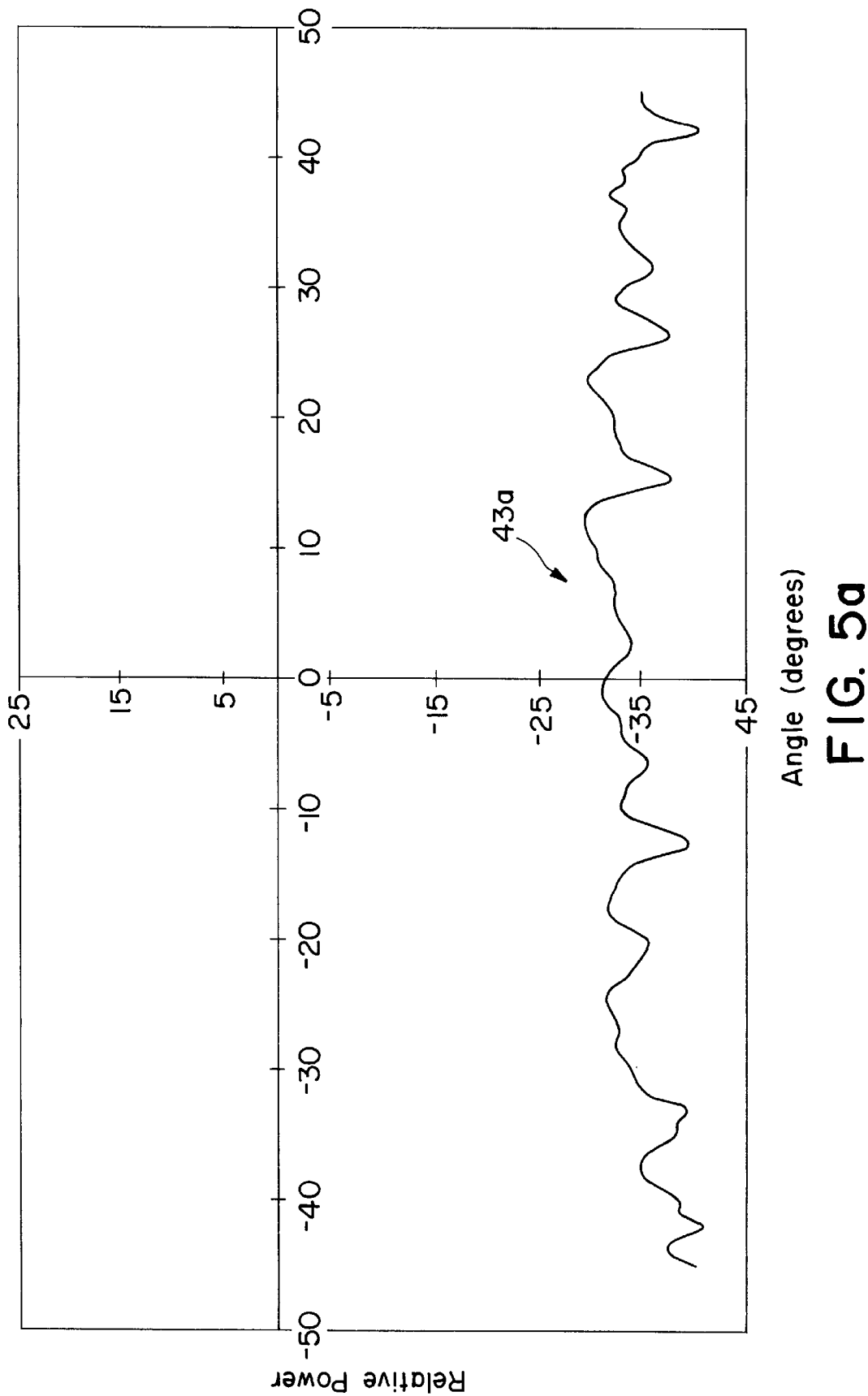
FIG. 5a is a plot of the signal power transceived by the antenna of the invention prior to processing by the matched filter.

Referring to FIG. 4, there is shown the curve 42 of the MEW power by the integrated circuit 33 plotted against the azimuth scan angle of the oscillating antenna 12. FIG. 5a represents the plot 42 of a MEW signal that has not been amplitude modulated by the modulator 34. It will be observed that in the area of the curve between +15° and −15° there is a wide peak or lobe 42 generated by the antenna. The image generating capability of such a beam scan will result in a very poor image having low resolution such that it will fail to accurately record the objects in the field of view. The plot of the detected MEW energy over the ±50° scan angle produced a lobe 42 which spans the portion of the curve from 15° to −15°. On either side of the lobe 42 there is produced a relatively low power (dB) level which represents extremely poor resolution. An analysis of the plot of the MEW energy in FIG. 4 indicates that objects that are emitting MEW energy on either side of the lobe 42 are low power and therefore may not be sensed by a receiver.

Figure 5B:
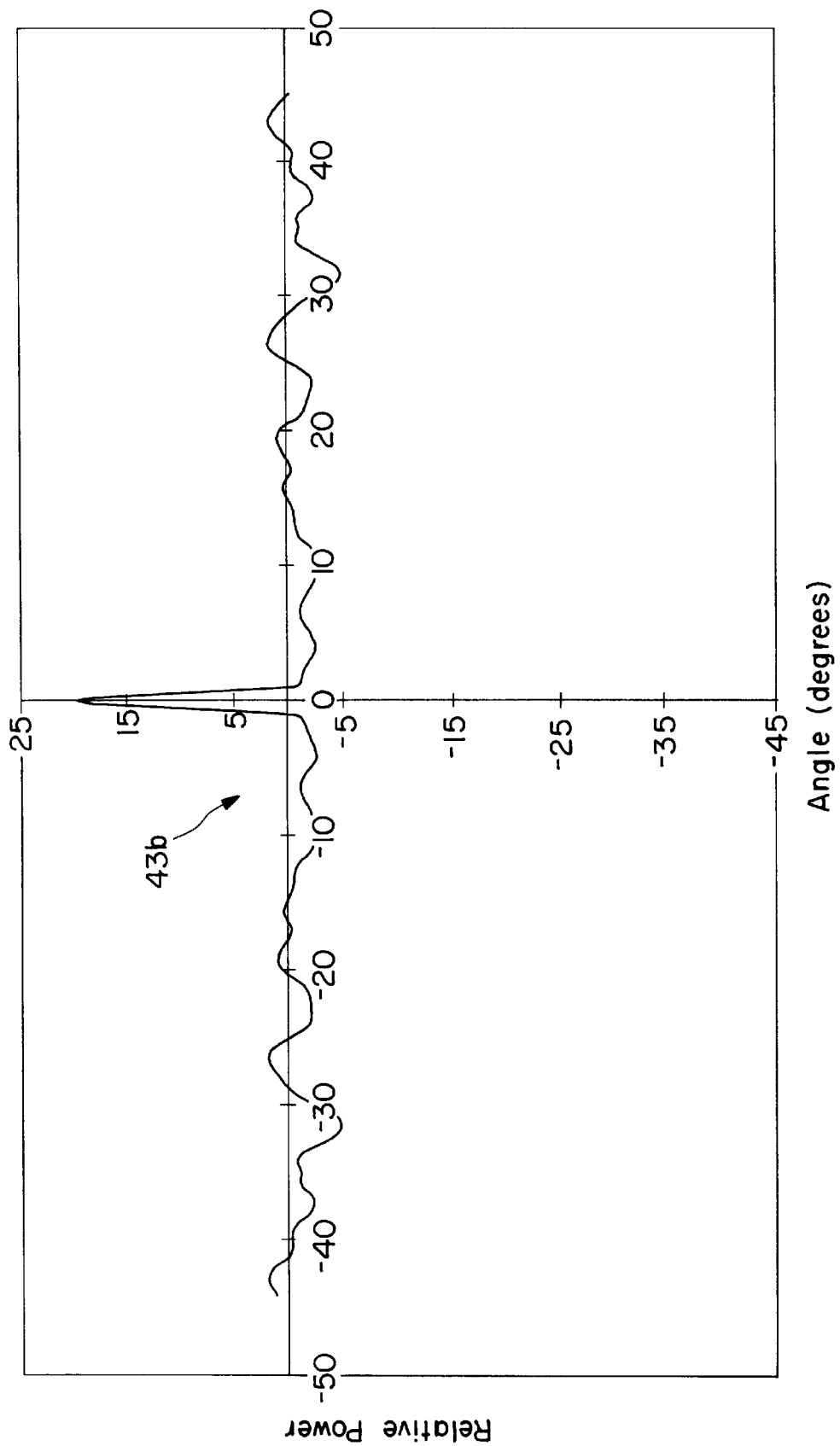
FIG. 5b is a plot of the data taken from 5a generated by the antenna of this invention and processed through the matched filter.
Figure 6:
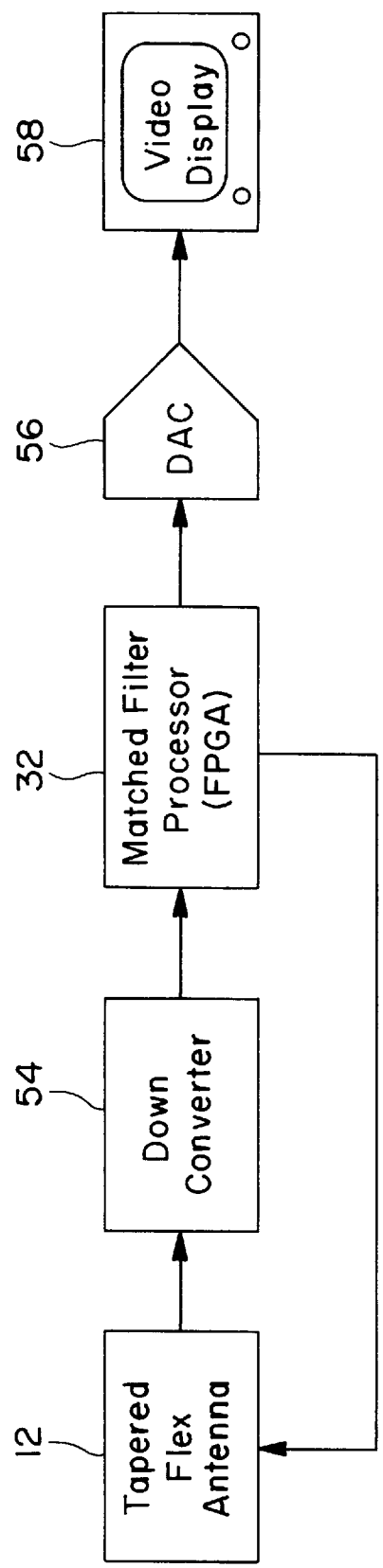
FIG. 6 is a flow diagram of the image-creating process converting the transceived signal and producing a recordable image.

Referring to FIGS. 5a and 5b, there is shown the unprocessed data generated by the antenna and after the same data has been processed by the flow diagram of FIG. 6.

FIG. 5a is a plot 43a of the power signal sensed by the antenna of FIG. 1 at different azimuth angles. The plot represents raw data which has not been processed through the processor shown in FIG. 6. It will be observed that the plot has no sharp peaks indicative of the absence of a suitable high resolution aperture. The creation of a high resolution antenna is achieved by processing the scanned data through the matched filter 32 of FIG. 6. This plot of the data shows that power of the signal at each angle of the antenna that has been modified by a predetermined basis function whereas the scan in FIG. 4 has not been modulated with a basis function.

The plot 43b of FIG. 5b represents the signal power that was collected representative of the plot in FIG. 5a that was down converted to a low level IF analog signal and then processed through the matched filter 32. The processor 32 performs the product of $W_n \times S$ (FIG. 3) using the orthogonal function which results in synthesizing the narrow aperture antenna. The raw data is autocorrelated against the template $W_n$. It will be appreciated that the synthesizing of the narrow aperture makes possible the formation a recordable, readable image of the scene scanned by the antenna.

Referring again to FIG. 2, the integrated circuit 33 is a MMIC chip which creates the MEW energy or RF signal when the apparatus 10 is operating either in the transmission mode or receiving mode. The integrated circuit chip 32 is a signal processor that processes the signal after it has been down converted to a low level IF signal. The integrated signal processor 32 detects the signal that has been received from a field of view scan or generates the appropriate beam to be transmitted in the case of the passive radar mode. In the preferred construction the integrated circuits 32 and 33 are integral with the tapered slot antenna 12 as opposed to carrying out the electronic processing of the signal away from the antenna structure. The present construction avoids against undue power loss by containing the frequency conversion circuitry within the glass envelope 14. It is understood that frequency conversion circuitry can be located remote from the apparatus 10. It is intended that the invention not be limited to where the circuitry is located. The solenoid coil driver 30 is in synchronization with the match filter processor 32 and the integrated circuits 32 and 33 are powered from a power supply 52. The signal processor 32 has input a template of the millimeter wave beam of the MEW beam pattern that presents an orthogonally modified reference wave that is compared with the MEW signal sensed when the apparatus 10 is oscillated for the purpose of imaging a field of view. This template is produced under controlled conditions by directing MEW energy transmitted from the antenna 12 and measured in a power sensor under conditions where the antenna 12 is not oscillating but stationary and is moved in an arc of a selected θ scan such as for example ±30°. Such a static scan at a distance of about 10'–20' from the power sensor will produce a controlled wave pattern which is input to the signal processor integrated circuit 32 as the template. The map of the measured energy is stored in the chip 32 memory.

In operation as a passive radar sensor the antenna structure will be directed to a field of view and adapted to receive millimeter wave signals in the range of 90–95 GHz, preferably 95 GHz. The antenna 12 is caused to oscillate at a rate of about 100 Hz and the transmitted millimeter wave MEW signal 33 is at a frequency of 95 GHz. The large order of magnitude difference between the low frequency oscillation of the antenna 12 relative to the extremely high frequency of the sensed MEW signal will render each portion of the field of view appear to be stationary relative the antenna scan. This results in a high resolution beam pattern of the objects across the field of scan. The signal received in the down converter 54 shown in FIG. 6 where it is converted to a low level IF analog signal. The down converted IF signal is then received by the signal processor 32 where it is correlated to the template stored in memory. The basis function of the received signal imposed on MEW signal by the 2 D amplitude modulator 34 will be matched through auto-correlation comparison with the template thereby creating a high resolution signal of the field of view. The signal generated by the antenna 12 is represented by the down converter 54 and the matched filter 32. The signal which has been detected and digitized can be received by a computer or stored in memory represented by the DAC 56 and video display 58.

Although the present invention has been described in considerable detail with reference to certain preferred versions thereof, other versions are possible. It is intended to cover all modifications, alternatives and equivalents which may fall within the spirit and scope of the invention as defined in the appended claims.

What is claimed is:

1. An apparatus for transmitting or receiving millimeter electromagnetic waves (MEWs) capable of creating an image of a field of view comprising:
   (a) a flexibly resilient slot array antenna having a metallized layer on one surface of a dielectric substrate;
   (b) a feed line formed in the metallized layer having a resonant cavity and transformer horn;
   (c) a generator for generating MEWs;
   (d) means for imparting orthogonality to the MEW including a signal processor and a 2 D amplitude modulator for generating a random orthogonal power distributed beam;
   (e) means for imparting a vibratory force to said flexibly resilient slot array antenna; and
   (f) an enclosure for containing said flexibly resilient slot array antenna in a vacuum environment.

2. The apparatus as claimed in claim 1 wherein the signal processor includes a 2 D amplitude modulator for imparting a basis function to the MEWs generated by the MEW generator.

3. The apparatus as claimed in claim 1 including a solenoid device for imparting a vibratory force to the flexibly resilient slot array antenna.

4. The apparatus as claimed in claim 1 wherein the signal processor and MEW generator are integrated with the flexibly resilient slot array antenna adjacent the resonant cavity.

5. The apparatus as claimed in claim 1 wherein the signal processor includes a template of an orthogonally distributed power beam as a correlator reference for the transceived MEW.

6. The apparatus as claimed in claim 1 wherein the flexibly resilient slot array antenna includes a 2 D orthogonal basis function amplitude modulator affixed to the leading edge thereof adjacent the transformer horn.

7. The apparatus as claimed in claim 6 wherein the geometry of the 2 D amplitude modulator comprises a dielectric base support on which is deposited a series of metal strips arranged in a predetermined series of rows in accordance with a set of orthogonal basis functions.

8. The apparatus as claimed in claim 7 wherein the length and width of the metal strips is proportional to the wave length of the MEWs that are transceived.

9. The apparatus as claimed in claim 1 wherein the MEW generator comprises a MMIC chip for generating the MEWs and the signal processor comprises an integrated circuit chip.

10. The apparatus as claimed in claim 9 wherein the transceived MEW is matched to the template wave stored in the signal processor by means of auto-correlation.

11. An apparatus for transmitting or receiving MEWs capable of sensing a 2 D image in a field of view, and creating an orthogonally distributed power beam, comprising (a) a flexibly resilient slot array antenna having a metallized layer on a surface of a dielectric substrate;

(b) a tapered feed line configured on said metallized layer comprising a transformer horn portion and a resonant cavity; said flexibly resilient slot antenna affixed to an armature adjacent the resonant cavity;

(c) a solenoid for periodically pushing said armature to impart a vibratory motion to said flexibly resilient tapered slot antenna;

(d) a 2 D amplitude modulator affixed to the leading edge of the flexibly resilient tapered slot antenna normal to the path of transceived MEWs and having affixed thereto an array of metal strips geometrically placed so that the arrays of metal strips are functionally orthogonal to one another; and (e) a control circuit comprising a MEW generator and a signal processor for matching the sensed MEWs with a predetermined template of orthogonally distributed power beams.

12. A slot array antenna for transceiving MEWs comprising (a) a flexibly resilient dielectric substrate having a metallized layer deposited on one surface;

(b) a feed line formed in the metallized layer including a resonant cavity and transformer horn;

(c) a microchip signal processor for processing the transceived signal;

(d) a microchip MEW transceiver that transmits and receives MEW energy, said microchips affixed to the metallized layer;

(e) modulating means for modulating the transceived signal in accordance with an orthogonal basis function, said modulator being affixed to the lead end of said substrate;

(f) means for imparting a vibratory motion to the substrate; and (g) an evacuated enclosure for enclosing the vibrating seat array antenna therein.

13. The invention as claimed in claim 12 wherein the vibratory motion is imparted by a solenoid driven magnetic driver.

14. The invention as claimed in claim 12 wherein the signal processor includes a matched filter for matching the sensed signal against a predetermined orthogonal wave form.

15. The invention as claimed in claim 12 wherein the processed MEW signal generates a high resolution antenna aperture in the range +2° to −2°.

16. The invention as claimed in claim 12 wherein the vibrating antenna transceives signals along the horizon and in the azimuth direction.

17. The invention as claimed in claim 12 wherein the modulator is constructed of metal strips on a dielectric insulating substrate in a pattern governed by a code transfer function.

18. The invention as claimed in claim 12 wherein the signal processor includes a template of the high resolution wave form.

* * * * *